United States Patent
Park et al.

(10) Patent No.: US 8,732,446 B2
(45) Date of Patent: May 20, 2014

(54) SELECTIVELY COMPRESSING BLOCKS OF A BOOTABLE SNAPSHOT IMAGE DURING BOOTING

(75) Inventors: Chan-Ho Park, Yongin-si (KR); Sang-Bum Suh, Seoul (KR); Chan-Ju Park, Suwon-si (KR); Myung-June Jung, Suwon-si (KR); Geun-Sik Lim, Hwaseong (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 13/187,732

(22) Filed: Jul. 21, 2011

(65) Prior Publication Data

US 2012/0131320 A1 May 24, 2012

(30) Foreign Application Priority Data

Nov. 23, 2010 (KR) ........................ 10-2010-0117049

(51) Int. Cl.
*G06F 9/00* (2006.01)
*G06F 15/177* (2006.01)

(52) U.S. Cl.
USPC .................................................. 713/2

(58) Field of Classification Search
USPC .................................................. 713/2
See application file for complete search history.

(56) References Cited

U.S. PATENT DOCUMENTS

| 2007/0015527 | A1 | 1/2007 | Kim | |
| 2007/0043890 | A1* | 2/2007 | Miller | 710/68 |
| 2007/0277051 | A1 | 11/2007 | Reece et al. | |
| 2009/0187673 | A1* | 7/2009 | Ramjee et al. | 709/247 |
| 2010/0030797 | A1* | 2/2010 | Johnson et al. | 707/101 |

OTHER PUBLICATIONS

Baik, et al: "Boosting up Embedded Linux device: experience on Linux-based Smartphone", Internet citation, Jul. 14, 2010, pp. 9-18, retrieved from the Internet: URL:http://kernel.org/doc/ols/201 0/0ls201 0-pages-9-18.pdf [retrieved on Mar. 25, 2013].*

Lee, et al.: "A Selective Compressed Memory Syste by On-line Data Decompressing", EUROMICRO Conference, 1999 Proceedings, 25th, vol. 1, retrieved from the Internet: URL: http://ieeexplore.ieee.org/stamp/stamp.jsp?tp=$arnumber=794470$isnumber=17212 [retrieved on Mar. 28, 2013].*

Extended European Search Report issued Jul. 13, 2012 in counterpart European Application No. EP76817RK900kap (11 pages, in English).

Baik K, et al. "Boosting up Embedded Linux device: experience on Linux-based Smartphone," Internet citation, Jul. 14, 2010, pp. 9-18, XP002678662, http://kernel.org/doc/ols/2010/ols2010, retrieved on Jun. 25, 2010. (12 pages, in English).

"2010 Linux Symposium Schedule," Jul. 6, 2010, XP02678663, http://web.archive.org/web/20100706060312/http://www.linuxsymposium.org/2010/schedule.php, retrieved Jun. 25, 2012.(3 pages, in English).

(Continued)

*Primary Examiner* — Thomas Lee
*Assistant Examiner* — Robert Cassity
(74) *Attorney, Agent, or Firm* — NSIP Law

(57) ABSTRACT

Provided are a booting apparatus and method using a snapshot image. A snapshot image may be divided into a plurality of blocks. Each of the blocks may be stored in a nonvolatile memory in a compressed or non-compressed format. The snapshot image may be incrementally loaded in units of the blocks during booting. The loading and decompression of the blocks may be performed in parallel.

20 Claims, 9 Drawing Sheets

(56) References Cited

OTHER PUBLICATIONS

Korean Office Action issued Mar. 28, 2014 in counterpart Korean Patent Application No. 10-2010-0117049 (6 pages, in Korean with English translation).

Sejin Park et al. "A Fast Booting Technique using Improved Snapshot Boot in Embedded Linux" Journal of KISS: computing practices, vol. 14, issue 6, pp. 594-598, In Korean with partial English Translation (Aug. 1, 2008).

* cited by examiner

SELECTIVELY COMPRESSING BLOCKS OF A BOOTABLE SNAPSHOT IMAGE DURING BOOTING

CROSS-REFERENCE TO RELATED APPLICATION(S)

This application claims the benefit under 35 U.S.C. §119 (a) of Korean Patent Application No. 10-2010-0117049, filed on Nov. 23, 2010, in the Korean Intellectual Property Office, the entire disclosure of which is incorporated herein by reference for all purposes.

BACKGROUND

1. Field

The following description relates to a technique for reducing the amount of time it takes to boot a system.

2. Description of the Related Art

With recent improvements in the performance of embedded devices, the use of rich operating systems (OSs) such as WINDOWS® Phone OS, IPHONE® OS, and ANDROID®/LINUX®, have become widespread.

As the functions supported by rich operating systems have diversified, the size of the operating system kernels and software platforms have increased. Large-size OS kernels and software platforms cause delays in system booting because they require a great amount of initialization routines and file loadings.

In order to address this problem, various methods such as hibernation and suspend-to-disk have been suggested. Hibernation and suspend-to-disk methods enable a quick system boot by storing random access memory (RAM) state information and CPU/device state information in a non-volatile storage medium such as a disk or a flash memory when powering off the system and the stored state information may be restored to its original location in a memory in response to the system being rebooted. The stored state information is also referred to as a snapshot image.

SUMMARY

In one general aspect, there is provided a booting apparatus using a snapshot image, the booting apparatus including an image generation unit configured to generate a snapshot image for use in snapshot booting, an image compression unit configured to divide the snapshot image into a plurality of blocks, determine whether to compress each of the respective blocks based on at least one of decompression times, loading times, deadline times, and compression rates of the blocks, and selectively compress one or more of the blocks, and a booting unit configured to, in response to snapshot booting being performed using the snapshot image, load a first block, and load a second block and simultaneously decompress the first block.

The image compression unit may further determine whether the blocks are to be loaded at an early stage of booting.

The image compression unit may determine a block is to be loaded at an early stage of booting based on whether the block is used to boot a terminal to an operational state.

The image compression unit may determine a block is to be loaded at an early stage of booting based on whether the block is necessary to boot a terminal during startup of the terminal.

In response to a block being a block to be loaded at an early stage of booting, the image compression unit may determine whether to compress the block by comparing a decompression time of the block with a loading time of a last block to be loaded.

In response to a block being a block to be loaded at an early stage of booting, the image compression unit may determine whether to compress the block by comparing a decompression time of the block with a loading time of a last block to be loaded, and by comparing a compression rate of the block with a predefined threshold.

In response to a block not being a block to be loaded at an early stage of booting, the image compression unit may determine whether to compress the block by comparing a sum of a decompression time and a loading time of the block with a deadline time of the block.

In response to a block not being a block to be loaded at an early stage of booting, the image compression unit may determine whether to compress the block by comparing a sum of a decompression time and a loading time of the block with a deadline time of the block, and by comparing a compression rate of the block with a predefined threshold.

The image compression unit may determine a block is not a block to be loaded at an early stage of booting when the block is not used to boot a terminal to an operational state.

The image compression unit may determine a block is not a block to be loaded at an early stage of booting when the block is not necessary to boot a terminal during startup of the terminal.

In another aspect, there is provided a computing apparatus for booting using a snapshot image, the computing apparatus including a plurality of processing cores, a first memory which is a volatile memory, and a second memory which is a nonvolatile memory, wherein one of the processing cores generates a snapshot image including state information of the first memory and/or each of the processing cores, divides the snapshot image into a plurality of blocks, selectively compresses one or more of the blocks based on at least one of decompression times, loading times, deadline times, and compression rates of the blocks, and stores the selectively-compressed blocks in the second memory, a first processing core loads the blocks stored in the first memory, and a second processing core decompresses each of the compressed blocks loaded in the first memory in parallel with the loading performed by the first processing core.

One of the processing cores may determine whether the blocks are to be loaded at an early stage of booting.

In response to a block being a block to be loaded at an early stage of booting, one of the processing cores may determine whether to compress the block by comparing a decompression time of the block with a loading time of a last block to be loaded.

In response to a block being a block to be loaded at an early stage of booting, one of the processing cores may determine whether to compress the block by comparing a decompression time of the block with a loading time of a last block to be loaded, and by comparing a compression rate of the block with a predefined threshold.

In response to the block not being a block to be loaded at an early stage of booting, one of the processing cores may determine whether to compress the block by comparing a sum of a decompression time and a loading time of the block with a deadline time of the block.

In response to the block not being a block to be loaded at an early stage of booting, one of the processing cores may determine whether to compress the block by comparing a sum of a decompression time and a loading time of the block with a deadline times of the block, and by comparing the compression rate of the block with a predefined threshold.

In another aspect, there is provided a booting method using a snapshot image, the booting method including generating a snapshot image for use in snapshot booting, dividing the snapshot image into a plurality of blocks, determining whether to compress each of the respective blocks based on at least one of decompression times, loading times, deadline times, and compression rates of the blocks, selectively compressing one or more of the blocks according to the results of the determining, and in response to snapshot booting being performed using the snapshot image, loading a first block during a first cycle, and loading a second block and simultaneously decompressing the first block, during a second cycle.

The determining whether to compress a block may comprise determining whether the block is a block that is to be loaded at an early stage of booting, in response to the block being a block to be loaded at an early stage of booting, determining whether a decompression time of the block is shorter than a loading time of a last block to be loaded, in response to the decompression time of the block being shorter than the loading time of the last block to be loaded, determining whether a compression rate of the block is higher than a predefined threshold, and in response to the compression rate of the block being higher than the predefined threshold, determining to compress the block.

The determining whether to compress a block may comprise determining whether the block is a block that is to be loaded at an early stage of booting, in response to the block not being a block to be loaded at an early stage of booting, determining whether a sum of a decompression time a loading time of the block are less than a deadline times of the block, in response to the sum of the decompression time and the loading time of the block being less than the deadline time of the block, determining whether a compression rate of the block is higher than a predefined threshold, and in response to the compression rate of the block being higher than the predefined threshold, determining to compress the block.

In another aspect, there is provided a terminal that boots based on a snapshot image, the terminal including a compression unit to divide a snapshot image into a plurality of data blocks, to determine whether to compress each of the data blocks, and to compress at least one data block, a first processor to incrementally load each of the data blocks, and a second processor to simultaneously decompress the at least one compressed data block while the first processor simultaneously loads another respective data block.

During booting based on the snapshot image, the first processor may load a first data block, and the first processor may load a second data block and the second processor may simultaneously decompress the first data block.

The terminal may further comprise a volatile memory for storing the snapshot boot image upon the terminal booting, and a non-volatile memory for storing the boot image stored in the volatile memory, prior to the terminal shutting down.

Other features and aspects may be apparent from the following detailed description, the drawings, and the claims.

Figure 1:
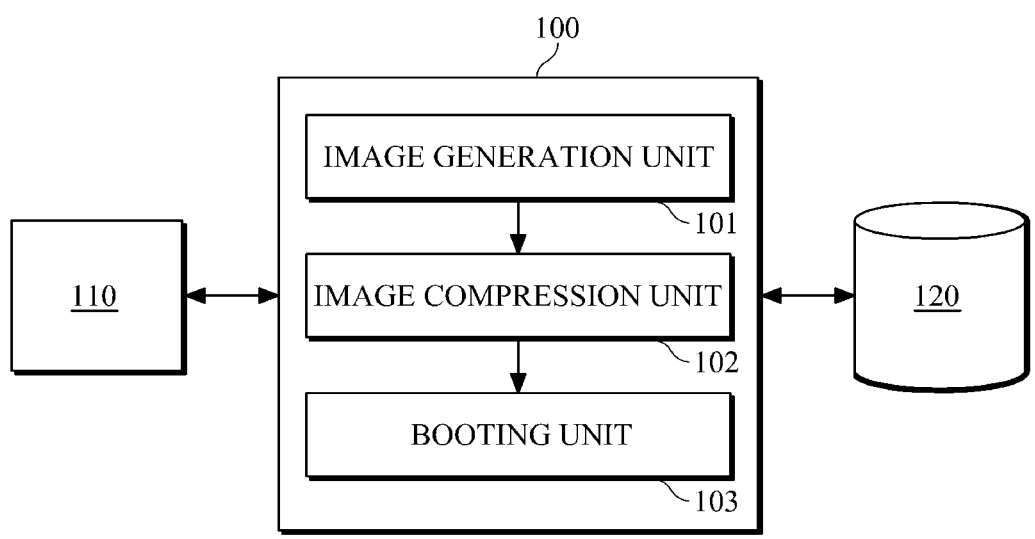
FIG. 1 is a diagram illustrating an example of a booting apparatus that uses a snapshot image.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of a booting apparatus using a snapshot image. The booting apparatus may be included in a terminal such as a mobile terminal, a computer, a personal digital assistant (PDA), a smart phone, an MP3 player, and the like.

Referring to FIG. 1, a booting apparatus 100 may be applied to various terminals that include an operating system (OS). For example, the various terminals may include an operating system that requires the loading of an OS kernel and an initialization routine when powered on.

The booting apparatus 100 may boot a terminal using a snapshot image. For example, the snapshot image may be system state information when the initial booting of the terminal is complete. The system state information may be state information of processors, memories, and/or input/output (I/O) devices that are included in the terminal. For example, if the booting of the terminal is complete, the booting apparatus 100 may generate the snapshot image. The generated snapshot image may be stored in a particular region in memory 110. The booting apparatus 100 may also store the snapshot image in disk 120. The disk 120, unlike the memory 110, may retain information that is stored therein even when power is cut off. Accordingly, if the terminal is rebooted, the booting apparatus 100 may load the snapshot image in the disk 120 to the memory 110, and may quickly reboot the terminal.

The booting apparatus 100 may load the snapshot image incrementally. In this example, the snapshot image may be classified into necessary data and non-necessary data. For example, the necessary data may be data that is loaded when the terminal is booted, and the non-necessary data may be data that does not necessarily need to be loaded when the terminal is booted. For example, the non-necessary data does not necessarily affect on the use of the terminal, and thus, even though the non-necessary data is not loaded, a terminal may boot. If the terminal is booted using the snapshot image, the booting apparatus 100 may load the necessary data and may load the non-necessary data as a background.

In the example shown in FIG. 1, the booting apparatus 100 includes an image generation unit 101, an image compression unit 102, and a booting unit 103.

The image generation unit 101 may generate a snapshot image. For example, the snapshot image may be system state information at the time immediately after booting of a terminal, and may be generated for a quick booting of the terminal. A booting operation using the snapshot image is referred to as snapshot-booting.

The image compression unit 102 may determine whether to compress the blocks. As described herein, compression is a process for reducing the size of data so as to reduce the storage space that is used for the data and/or the time that is used to transmit the data. For example, the image compression unit 102 may determine whether to compress each of the blocks based on a number of factors such as the decompression time, the loading time, the deadline time, the compression rate of each of the blocks, and the like. The decompression time of each of the blocks is the time taken to decompress each of the blocks. The loading time of each of the blocks is the time taken to load each of the blocks from the disk 120 to the memory 110 during snapshot booting.

The image compression unit 102 may determine whether to compress the blocks. As described herein, compression is a process for reducing the size of data so as to reduce the storage space that is used for the data and/or the time the time that is used to transmit the data. For example, the image compression unit 102 may determine whether to compress each of the blocks based on a number of factors such as the decompression time, the loading time, the deadline time, the compression rate of each of the blocks, and the like. The decompression time of each of the blocks is the time taken to decompress each of the blocks. The loading time of each of the blocks is the time taken to load each of the blocks from the disk 120 to the memory 110 during snapshot booting.

As described herein, the booting apparatus 100 may load the snapshot image incrementally, for example, in units of blocks. The deadline time of each of the blocks may indicate the point in time at which the loading of each of the blocks must be completed. In this example, the blocks need to load before their deadline times in order for the terminal to operate normally. The compression rate of each of the blocks may indicate the degree to which the size of each of the blocks may be reduced.

The image compression unit 102 may selectively compress blocks. For example, the image compression unit 102 may determine whether to compress each of the blocks and which blocks to compress, may compress one or more blocks that are determined to be compressed, and may not compress one or more blocks that are determined not to be compressed.

The image compression unit 102 stores the snapshot image, which may have some blocks that are compressed and other blocks that are not compressed, in the disk 120.

The booting unit 103 may boot the terminal based on the snapshot image that is stored in the disk 120. The booting unit 103 may load the snapshot image from the disk 120 into the memory 110. In this example, the booting unit 103 may load the snapshot image from the disk 120 into the memory 110 in units of the blocks.

The booting unit 103 may perform the loading of a block and the decompression of another block. For example, referring to FIG. 3D, the snapshot image 300 is stored in the disk 120, and the booting unit 103 loads block #0 into the memory 110 during a first cycle. During a second cycle, the booting unit 103 loads block #1 into the memory 110, and at the same time, decompress block #0 if block #0 is was compressed. If the terminal is equipped with a plurality of processing cores, the booting unit 103 may activate multiple processing cores, and may boot the terminal in parallel in the multiple processing cores.

Figure 2:
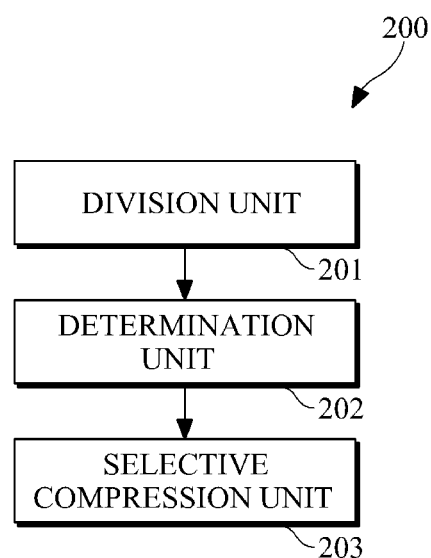
FIG. 2 is a diagram illustrating an example of an image compression apparatus.

FIG. 2 illustrates an example of an image compression apparatus. The compression apparatus is an example of the image compression unit 102 illustrated in FIG. 1.

Referring to FIG. 2, image compression apparatus 200 includes a division unit 201, a determination unit 202, and a selective compression unit 203.

The division unit 201 may divide a snapshot image into a plurality of blocks. Each block may include one or more pages. The compression and decompression of the snapshot image may be performed in units of the blocks. The storing and loading of the snapshot image may be performed in units of the blocks. For example, referring to FIG. 3A, the division unit 201 may divide the snapshot image 300 into a plurality of blocks such as block #0 through block #n.

The determination unit 202 may determine whether to compress one or more of the blocks.

Figure 3A:
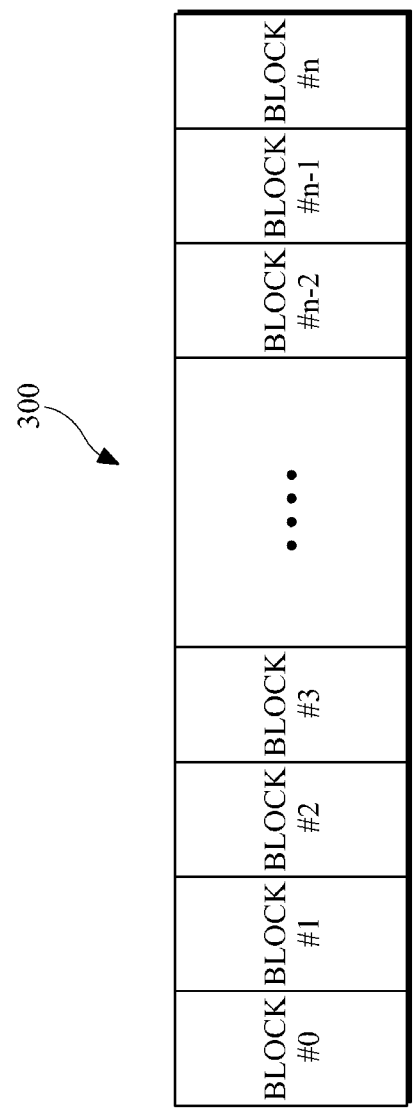
FIGS. 3A through 3D are diagrams illustrating examples of the operation of the booting apparatus.
Figure 3B:
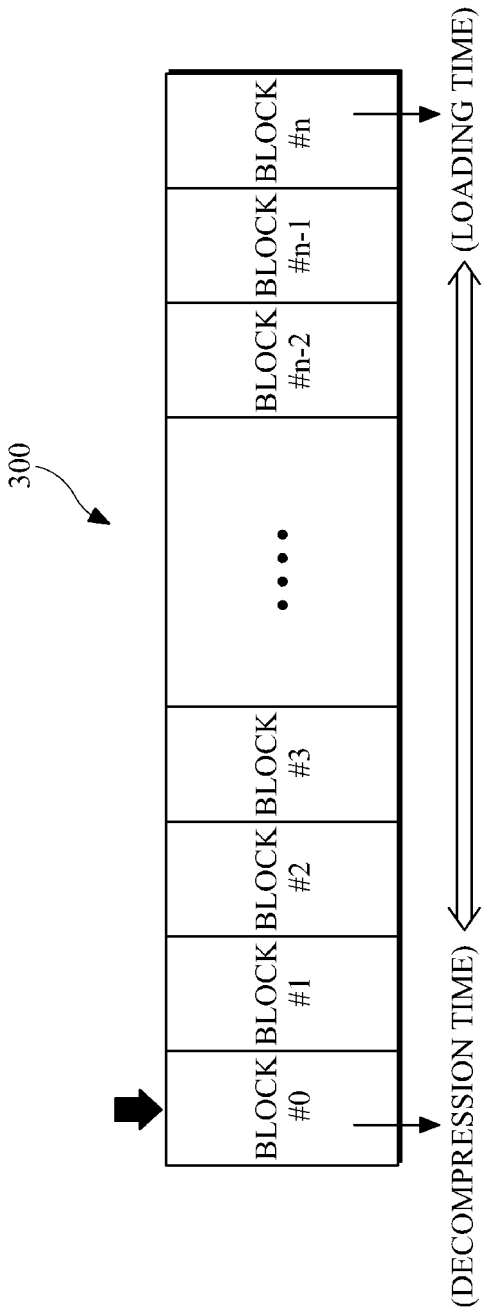

An example of determining whether to compress a block by the determination unit 202 is illustrated in FIG. 3B. Referring to FIG. 3B, the determination unit 202 determines whether a particular block is a necessary block. For example, if the particular block is a necessary block, the determination unit 202 may determine whether to compress the particular block by comparing the decompression time of the particular block and the loading time of a last block to be loaded.

In the example of FIG. 3B, the determination unit 202 determines whether to compress block #0. The determination unit 202 may determine whether block #0 is a necessary block that includes data pages that are to be loaded at an early stage of snapshot booting. For example, if block #0 is a boot block, the determination unit 202 may compare the decompression time of block #0 with the loading time of block #n, which is the last block to be loaded. In this example, if the decompression time of block #0 is less than the loading time of block #n, the determination unit 202 may determine whether block #0 can be compressed at a rate that is higher than a predefined threshold. If block #0 can be compressed at a rate that is higher than the predefined threshold, the determination unit 202 may determine that block #0 is to be compressed.

Figure 3C:
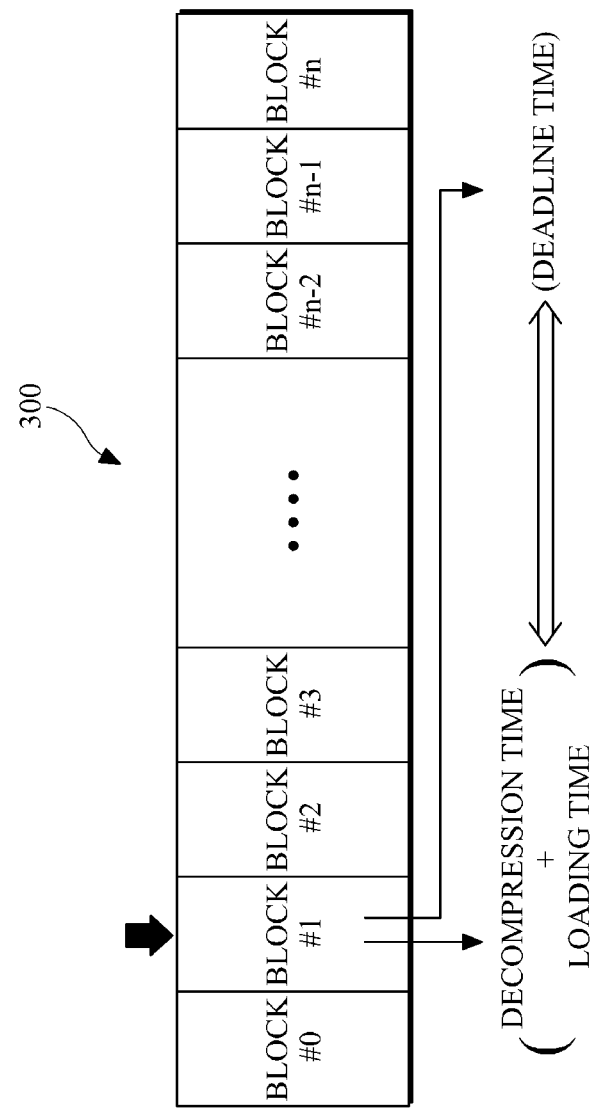

Another example of determining whether to compress a block by the determination unit 202 is illustrated in FIG. 3C. Referring to FIG. 3C, the determination unit 202 may determine whether a particular block is a necessary block. If the particular block is a not necessary block (i.e. non-necessary block), the determination unit 202 may determine whether to compress the particular block by comparing a sum of the decompression time and loading time of the particular block with the deadline times of the particular block.

For example, referring to FIG. 3C, the determination unit 202 determines whether to compress block #1. The determination unit 202 may determine whether block #1 is a non-necessary block. For example, non-necessary blocks are blocks that include data pages that do not necessarily need to be loaded at an early stage of snapshot booting, and may be loaded as a background after the early stage of snapshot booting.

If block #1 is a non-necessary block, the determination unit 202 may add the decompression time and loading time of block #1, and compare the sum of the decompression time and loading time of block #1 with the deadline time of block #1. If the sum of the decompression time and loading time of block #1 is less than the deadline time of block #1, the determination unit 202 may determine that block #1 should be compressed. As another example, if the sum of the decompression time and loading time of block #1 is less than the deadline time of block #1, the determination unit 202 may determine whether block #1 can be compressed at a rate that is higher than a predefined threshold, and may determine that block #1 should be compressed if block #1 can be compressed at a rate that is higher than the predefined threshold.

Referring back to FIG. 2, the selective compression unit 203 selectively compresses the blocks of the snapshot image based on the result of the determination that is performed by the determination unit 202. In this example, a selective compression may be interpreted as compressing or not compressing blocks based on a predefined rule.

The selective compression unit 203 may store the blocks of the snapshot image in the disk 120 (e.g., a nonvolatile memory) as illustrated in FIG. 1.

FIGS. 3A through 3D illustrate examples of the operation of the booting apparatus. Referring to FIG. 3A, the snapshot image 300 is divided into a plurality of blocks. For example, the snapshot image 300 may be divided into block #0 through block #n.

Referring to FIG. 3B, a determination is made as to whether to compress a necessary block based on the decompression time of the necessary block and the loading time of a last block to be loaded. For example, if block #0 is a necessary block, a determination may be made as to whether the decompression time of block #0 is shorter than the loading time of block #n, which is the last block to be loaded. For example, if the decompression time of block #0 is shorter than the loading time of block #n, block #0 may be determined as a block to be compressed.

Referring to FIG. 3C, a determination may be made as to whether to compress a non-necessary lock based on the sum of the decompression time and loading time of the non-necessary block and the deadline time of the non-necessary block. For example, if block #1 is a non-necessary block, a determination may be made as to whether the sum of the decompression time and loading time of block #1 is less than the deadline time of block #1. If the sum of the decompression time and loading time of block #1 is less than the deadline time of block #1, block #1 may be determined as a block that is to be compressed.

Figure 3D:
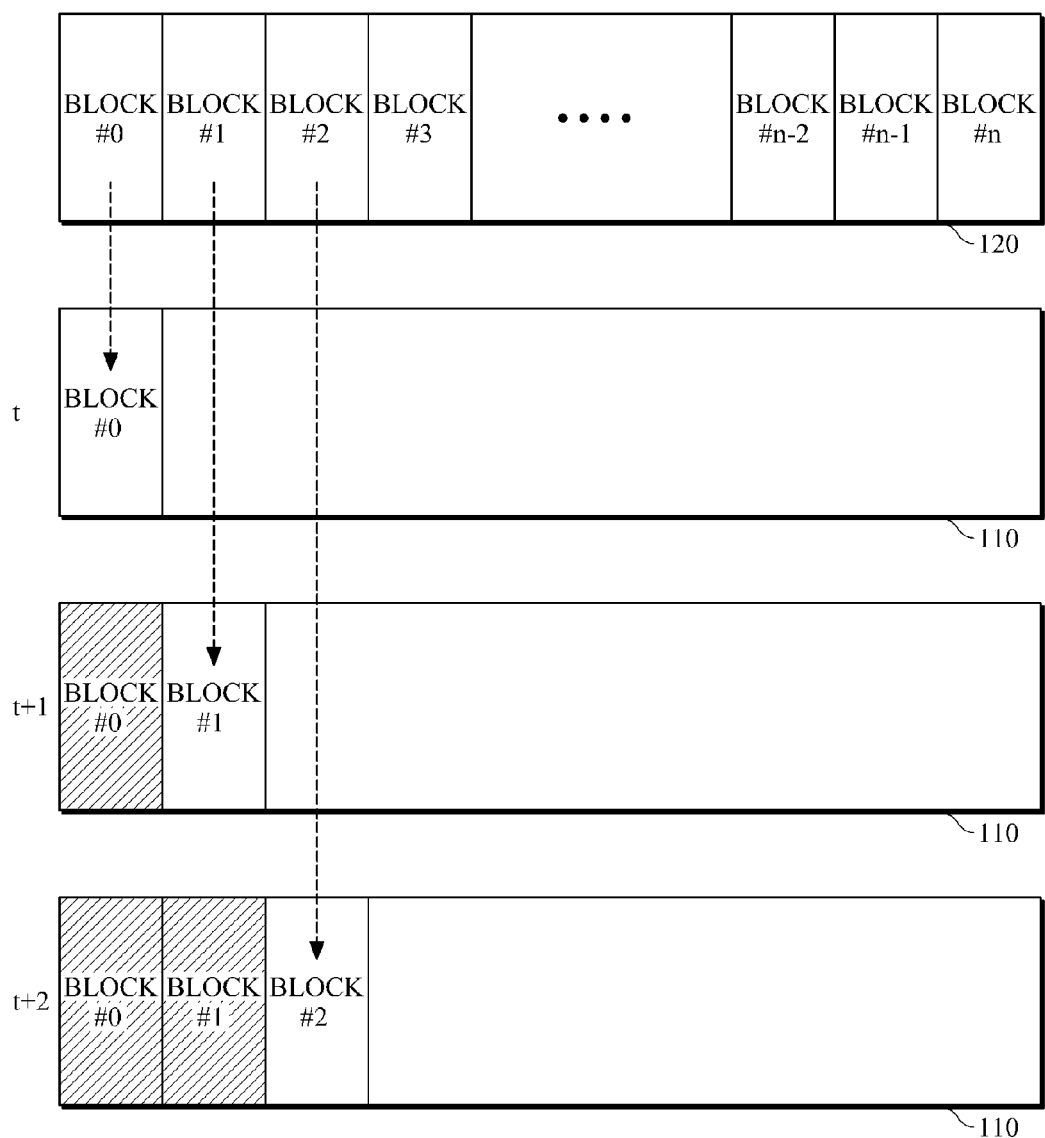

Referring to FIG. 3D, the loading and decompression of each block may be performed in parallel. For example, block #0 may be loaded at a time t, and block #1 may be loaded at a time (t+1). If block #0 is a compressed block, the loading of block #1 and the decompression of block #0 may be performed at the same time. As another example, if block #1 is not compressed, the decompression of block #1 may not be performed. Similarly, if block #1 is a compressed block, the loading of block #2 and the decompression of block #1 may be performed at the same time at a time (t+2).

The parallel processing may be performed by a terminal that is equipped with a plurality of processing cores. For example, if a terminal is equipped with two processing cores that are driven independently, one of the processing cores may be configured to handle the loading of a block, and the other processing core may be configured to handle the decompression of the block at the same time. The example of the booting apparatus 100 illustrated in FIG. 1 may activate at least two processing cores in a terminal during snapshot booting.

Figure 4:
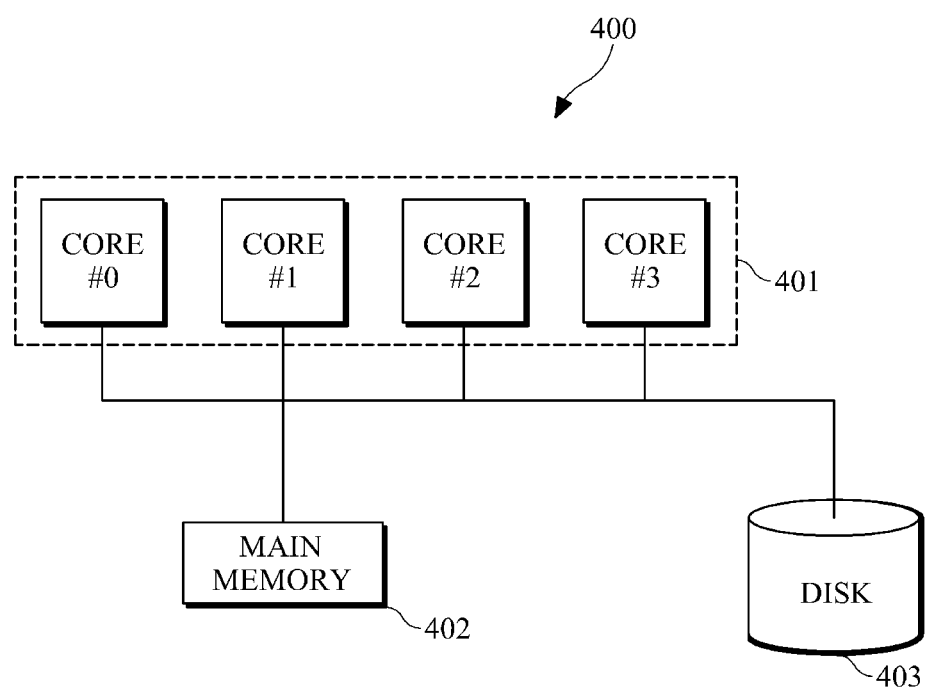
FIG. 4 is a diagram illustrating an example of a computing apparatus.

FIG. 4 illustrates an example of a computing apparatus. The computing apparatus is an example of a terminal to which a booting apparatus may be applied. Referring to FIG. 4, computing apparatus 400 includes a core unit 401, a main memory 402, and a disk 403.

The core unit 401 includes a plurality of processing cores, i.e., cores #0 through #3. The processing cores may process multiple tasks in parallel.

When power is applied to the computing apparatus 400, the computing apparatus 400 is booted. In this example, an initial booting of the computing apparatus 400 may be performed using a typical booting method, instead of using a snapshot image.

When the initial booting of the computing apparatus 400 is complete, core #0 may generate a snapshot image. For example, core #0 may generate state information of the core unit 401 and the main memory 402 at the time immediately after the initial booting of the computing apparatus 400, as the snapshot image. The snapshot image may be temporarily stored in a region of the main memory 402. For example, the main memory 402 may be a volatile memory.

Core #0 may divide the snapshot image into a plurality of blocks and determine whether to compress the blocks. Core #0 may selectively compress the blocks based on the results of the determination, and store the selectively-compressed blocks in the disk 403. For example, the disk 403 may be a nonvolatile memory.

When power is cut off and restored, the computing apparatus 400 may be booted based on the snapshot image stored in the disk 403.

For example, during snapshot booting, at least cores #0 and #1 may be activated by a boot loader (not shown). An example of the boot loader may be the booting unit 103 illustrated in FIG. 1.

In response to being activated, cores #0 and #1 may perform the loading and the decompression of the blocks of the snapshot image in parallel. As an example, during a first cycle, core #0 may load a first block of the snapshot image from the disk 403 into the main memory 402. During a second cycle, core #0 may load a second block of the snapshot image from the disk 403 into the main memory 402, and core #1 may simultaneously decompress the first block if the first block is determined to be a compressed block.

Figure 5:
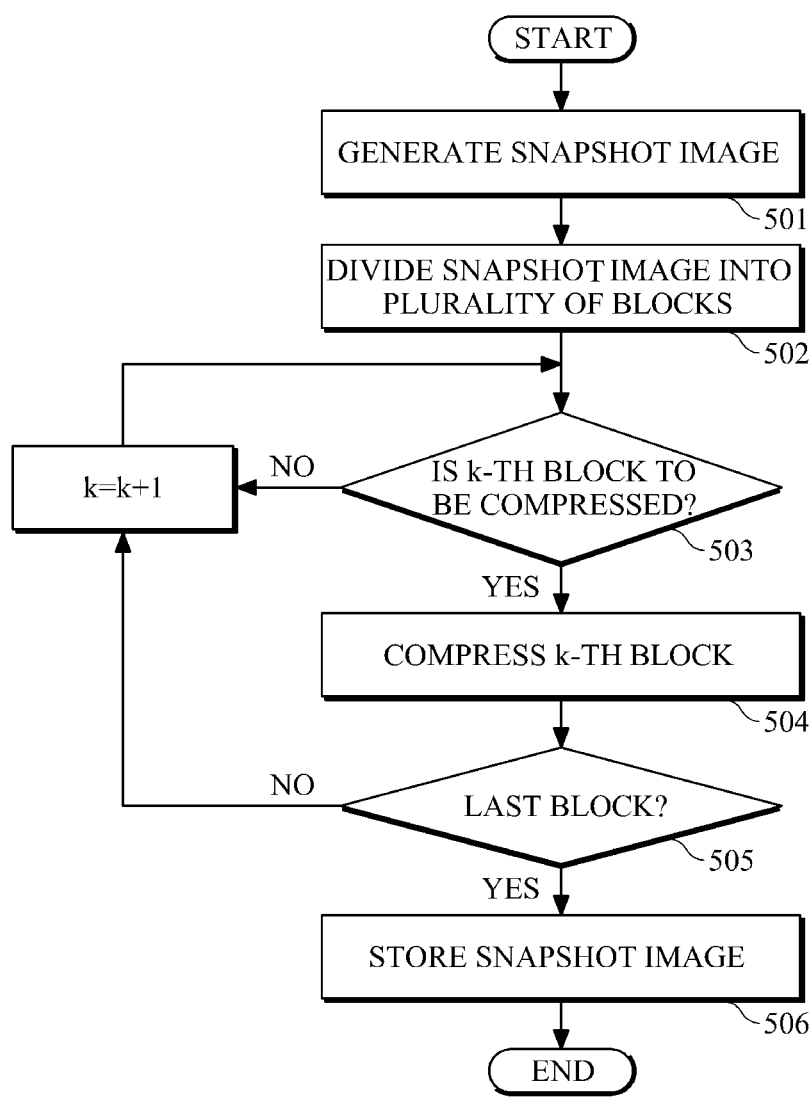
FIG. 5 is a diagram illustrating an example of a booting method that uses a snapshot image.

FIG. 5 illustrates an example of a booting method using a snapshot image. The booting method is an example of selectively compressing a snapshot image and storing the snapshot image.

Referring to FIG. 5, the booting apparatus generates a snapshot image, in 501. For example, the booting apparatus may generate a snapshot image that includes state information at the time immediately after the booting of the computing apparatus is complete.

The booting apparatus divides the snapshot image into a plurality of blocks, in 502. For example, the booting apparatus may divide the snapshot image into a plurality of blocks, as shown in FIG. 3A.

The booting apparatus determines whether to compress the blocks, in 503. For example, the booting apparatus may determine whether a block should be compressed, as shown in FIGS. 3B and 3C.

If the block is determined as a block to be compressed, the booting apparatus compresses the block, in 504. As another example, if the block is determined as a block that is not to be compressed, the booting apparatus may determine whether the next block should be compressed. For example, if a kth block is determined to be compressed or not to be compressed, k may be increased by one so that the above-mentioned operations can be performed on a (k+1)-th block.

The booting apparatus determines whether the k-th block is a last block, in 505. If the k-th block is the last block, the booting apparatus stores a snapshot image that is obtained by selectively compressing the blocks in a disk, in 506. As another example, if the k-th block is not the last block, k is increased by one so that the above-mentioned operations can be performed on the (k+1)-th block.

Figure 6:
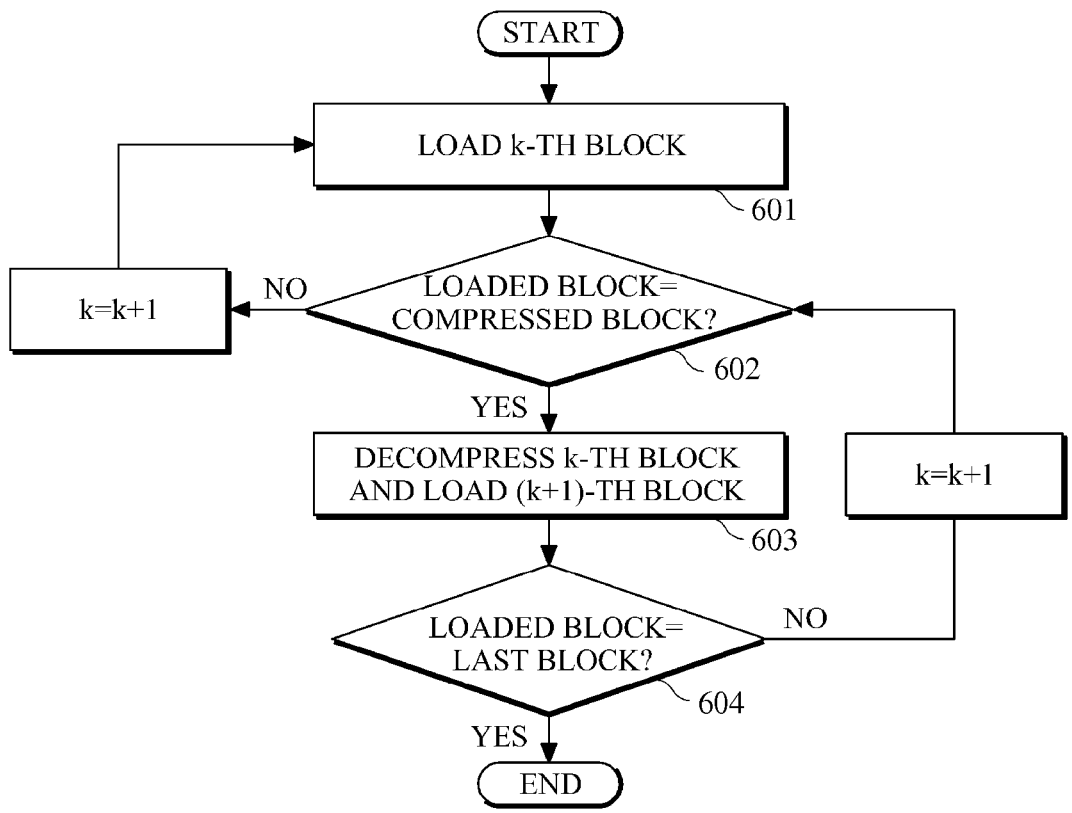
FIG. 6 is a diagram illustrating another example of a booting method that uses a snapshot image.

FIG. 6 illustrates another example of a booting method using a snapshot image. The booting method illustrates an example of incrementally loading a snapshot image and performing the loading and decompression of each block of the snapshot image at the same time.

Referring to FIGS. 1 through 4 and 6, the booting apparatus 100 loads a k-th block as part of snapshot booting, in 601. For example, the booting unit 103 may activate each of the cores

0 through #3 in the core unit 401, and core #0 may load the k-th block from the disk 403 into the memory 402.

The booting apparatus 100 determines whether the k-th block is a compressed block, in 602. If the k-th block is not a compressed block, the booting apparatus 100 loads a (k+1)-th block. On the other hand, if the k-th block is a compressed block, the booting apparatus 100 decompresses the k-th block and at the same time, and simultaneously loads the (k+1)-th block, in 603. For example, the booting unit 103 may activate each of the cores #0 through #3 in the core unit 401, and core #0 may decompress the k-th block, while core #1 loads the (k+1)-th block, as shown in FIG. 3D.

The booting apparatus 100 determines whether the k-th block is a last block, in 604. If the k-th block is not the last block, the booting apparatus 100 performs the above-mentioned operations on the (k+1)-th block.

As described above, it is possible to reduce the size of a snapshot image by selectively compressing the snapshot image in units of blocks and storing the selectively-compressed snapshot image. In addition, it is possible to reduce the time that it takes to boot a system by performing the loading and decompression of each block of a snapshot image at the same time during the incremental loading of the snapshot image.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A booting apparatus using a snapshot image, the booting apparatus comprising:
an image generation unit configured to generate a snapshot image for use in snapshot booting;
an image compression unit configured to divide the snapshot image into blocks, to determine whether to compress the block by comparing a decompression time of the block with a loading time of a last block to be loaded in response to the block being loaded at an early stage of booting, and to determine whether to compress the block by comparing a sum of a decompression time and a loading time of the block with a deadline time of the block in response to the block not being loaded at the early stage of booting; and
a booting unit configured to, in response to snapshot booting being performed using the snapshot image, load a first block, and simultaneously load a second block and decompress the first block.

2. The booting apparatus of claim 1, wherein the image compression unit further determines whether the blocks are to be loaded at an early stage of booting.

3. The booting apparatus of claim 2, wherein the image compression unit determines a block is to be loaded at an early stage of booting based on whether the block is used to boot a terminal to an operational state.

4. The booting apparatus of claim 2, wherein the image compression unit determines a block is to be loaded at an early stage of booting based on whether the block is necessary to boot a terminal during startup of the terminal.

5. The booting apparatus of claim 2, wherein, in response to a block being a block to be loaded at an early stage of booting, the image compression unit determines whether to compress the block based on at least one of decompression times, loading times, compression rates, and deadline times of the blocks.

6. The booting apparatus of claim 2, wherein, in response to a block being a block to be loaded at an early stage of booting, the image compression unit determines whether to compress the block by comparing a decompression time of the block with a loading time of a last block to be loaded, and by comparing a compression rate of the block with a predefined threshold.

7. The booting apparatus of claim 2, wherein, in response to a block not being a block to be loaded at an early stage of booting, the image compression unit determines whether to compress the block by comparing a sum of a decompression time and a loading time of the block with a deadline time of the block.

8. The booting apparatus of claim 2, wherein, in response to a block not being a block to be loaded at an early stage of booting, the image compression unit determines whether to compress the block by comparing a sum of a decompression time and a loading time of the block with a deadline time of the block, and by comparing a compression rate of the block with a predefined threshold.

9. The booting apparatus of claim 2, wherein the image compression unit determines a block is not a block to be loaded at an early stage of booting when the block is not used to boot a terminal to an operational state.

10. The booting apparatus of claim 2, wherein the image compression unit determines a block is not a block to be loaded at an early stage of booting when the block is not necessary to boot a terminal during startup of the terminal.

11. A computing apparatus for booting using a snapshot image, the computing apparatus comprising:
a plurality of processing cores;
a first memory that is a volatile memory; and
a second memory that is a nonvolatile memory,
wherein one of the processing cores is configured to generate a snapshot image including state information of the first memory and/or each of the processing cores, to divide the snapshot image into a plurality of blocks, to selectively compress one or more of the blocks by comparing a decompression time of the block with a loading time of a last block to be loaded in response to the block being loaded at an early stage of booting, to selectively compress one or more of the blocks by comparing a sum of a decompression time and a loading time of the block with a deadline time of the block in response to the block not being loaded at the early stage of booting, and to store the selectively-compressed blocks in the second memory, a first processing core is configured to load the blocks stored in the first memory, and a second processing core is configured to decompress each of the compressed blocks loaded in the first memory in parallel with the loading performed by the first processing core.

12. The computing apparatus of claim 11, wherein one of the processing cores determines whether the blocks are to be loaded at an early stage of booting.

13. The computing apparatus of claim 12, wherein, in response to a block being a block to be loaded at an early stage of booting, one of the processing cores determines whether to compress the block by comparing a decompression time of the block with a loading time of a last block to be loaded.

14. The computing apparatus of claim 12, wherein, in response to a block being a block to be loaded at an early stage of booting, one of the processing cores determines whether to compress the block by comparing a decompression time of the block with a loading time of a last block to be loaded, and by comparing a compression rate of the block with a predefined threshold.

15. The computing apparatus of claim 12, wherein, in response to the block not being a block to be loaded at an early stage of booting, one of the processing cores determines whether to compress the block by comparing a sum of a decompression time and a loading time of the block with a deadline time of the block.

16. The computing apparatus of claim 12, wherein, in response to the block not being a block to be loaded at an early stage of booting, one of the processing cores determines whether to compress the block by comparing a sum of a decompression time and a loading time of the block with a deadline times of the block, and by comparing the compression rate of the block with a predefined threshold.

17. A booting method using a snapshot image, the booting method comprising:
generating a snapshot image for use in snapshot booting;
dividing the snapshot image into a plurality of blocks;
determining whether a block is to be loaded at an early stage of booting;
in response to the block being loaded at the early stage of booting, determining whether to compress the block by comparing a decompression time of the block with a loading time of a last block to be loaded;
in response to the block not being loaded at the early stage of booting, determining whether to compress the block by comparing a sum of a decompression time and a loading time of the block with a deadline time of the block;
selectively compressing one or more of the blocks according to the results of the determining whether to compress the block; and
in response to snapshot booting being performed using the snapshot image, loading a first block during a first cycle, and loading a second block and simultaneously decompressing the first block, during a second cycle.

18. The booting method of claim 17, wherein the determining whether to compress a block comprises:
in response to the being a block to be loaded at an early stage of booting, determining whether a decompression time of the block is shorter than a loading time of a last block to be loaded;
in response to the decompression time of the block being shorter than the loading time of the last block to be loaded, determining whether a compression rate of the block is higher than a predefined threshold; and
in response to the compression rate of the block being higher than the predefined threshold, determining to compress the block.

19. The booting method of claim 17, wherein the determining whether to compress a block comprises:
in response to the block not being a block to be loaded at an early stage of booting, determining whether a sum of a decompression time a loading time of the block are less than a deadline times of the block;
in response to the sum of the decompression time and the loading time of the block being less than the deadline time of the block, determining whether a compression rate of the block is higher than a predefined threshold; and
in response to the compression rate of the block being higher than the predefined threshold, determining to compress the block.

20. A terminal that boots based on a snapshot image, the terminal comprising:
a compression unit configured to divide a snapshot image into data blocks, to determine whether to compress each of the data blocks based on comparing a decompression time of the data blocks with a loading time of a last data block to be loaded in response to the block being loaded at an early stage of booting, to determine whether to compress each of the data blocks based on comparing a sum of a decompression time and a loading time of the block with a deadline time of the block in response to the block not being loaded at the early stage of booting, and to compress at least one data block;
a first processor configured to incrementally load each of the data blocks; and
a second processor configured to simultaneously decompress the at least one compressed data block while the first processor simultaneously loads another data block.

* * * * *